INVENTOR.
JOSEPH J. RILEY
BY
William J. Ruano

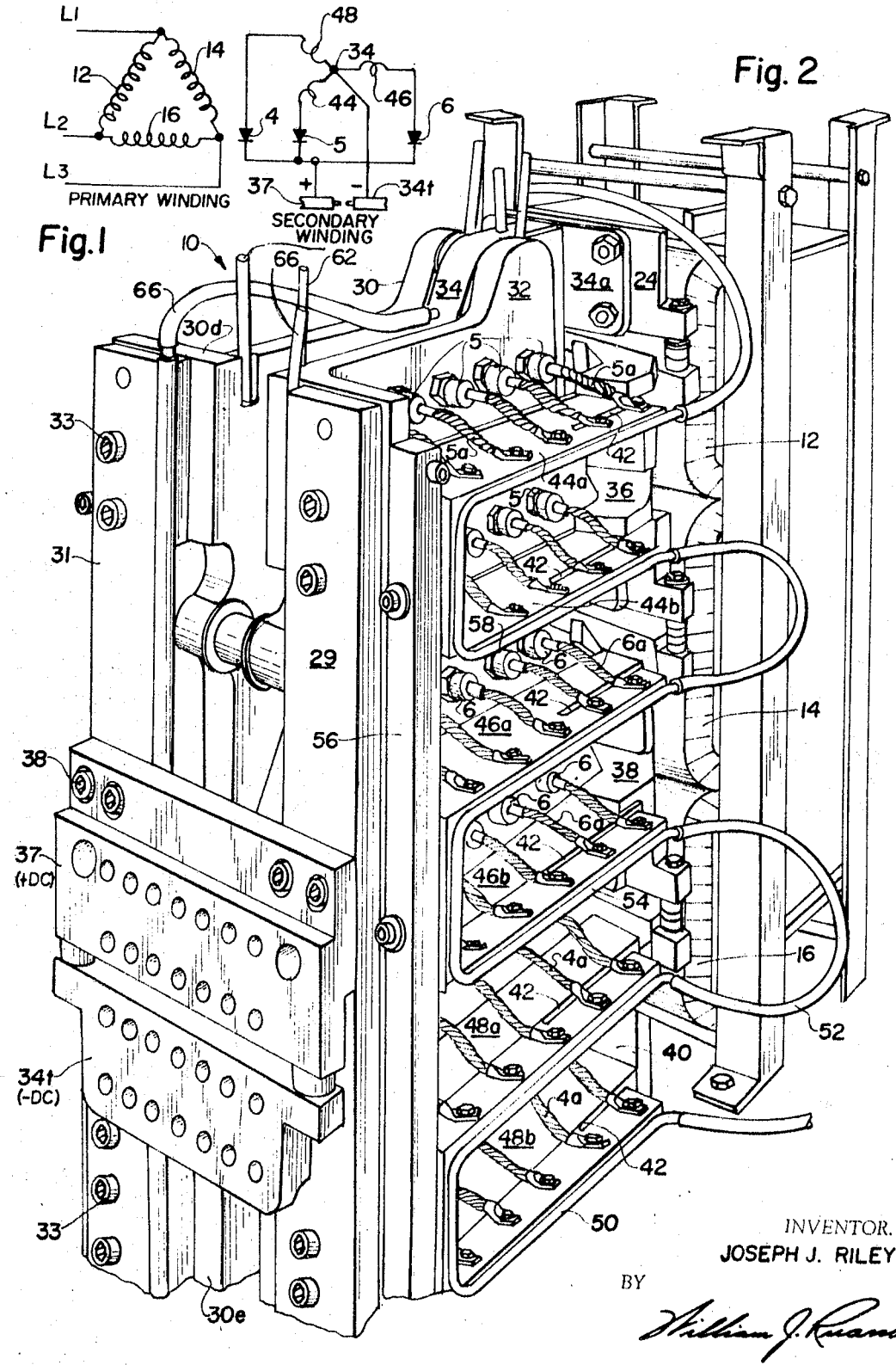

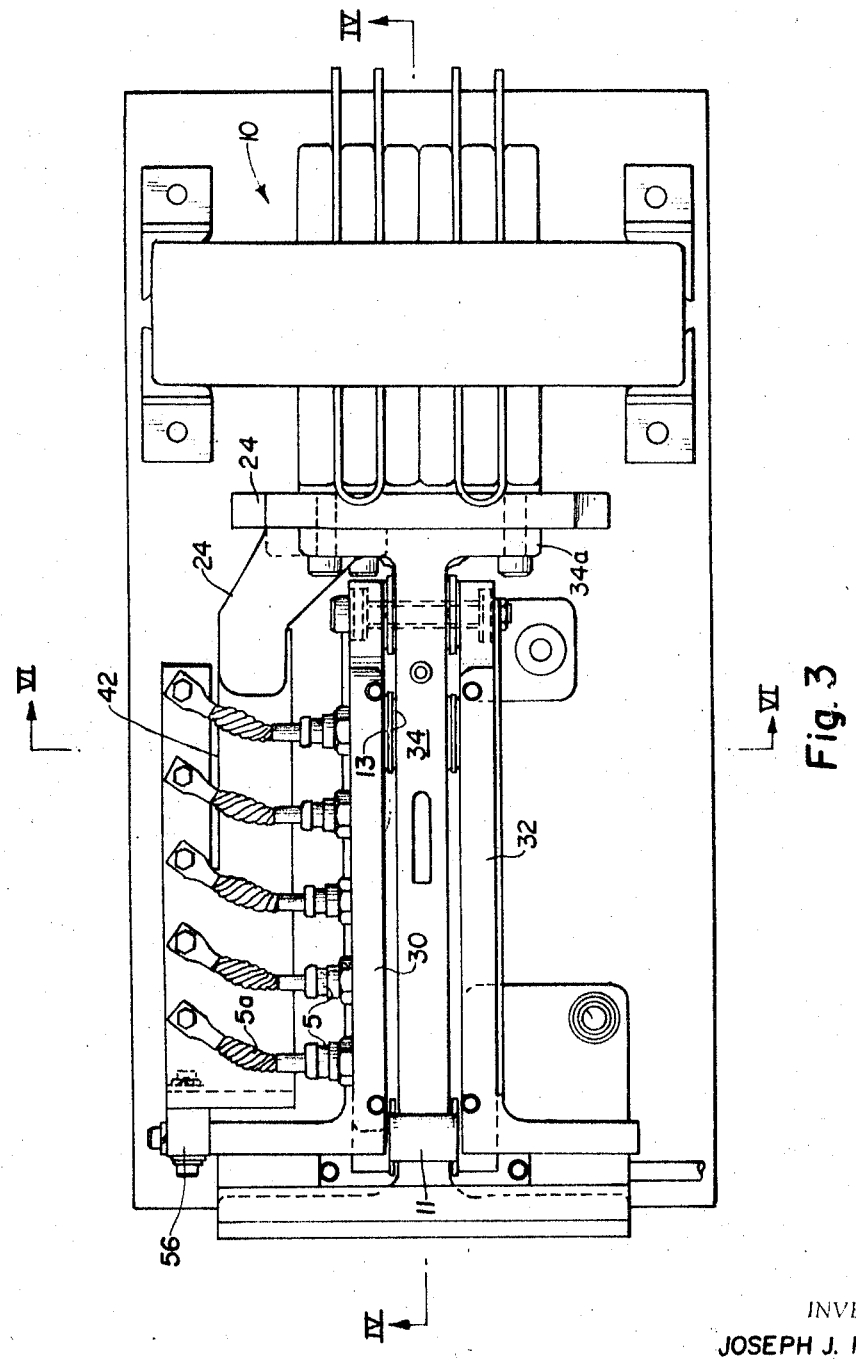

INVENTOR
JOSEPH J. RILEY

United States Patent Office 3,460,022
Patented Aug. 5, 1969

3,460,022
THREE-PHASE POWER PACK FOR WELDING
Joseph J. Riley, Warren, Ohio, assignor to The Taylor-Winfield Corporation, Warren, Ohio
Filed June 22, 1967, Ser. No. 648,074
Int. Cl. H02m 7/00; B23k 11/24
U.S. Cl. 321—8                  11 Claims

ABSTRACT OF THE DISCLOSURE

A D.C. silicon rectifier power pack for welding and other high D.C. current applications includes a neutral conductor sandwiched between and insulated from two direct current, water-cooled plates constructed to provide equal current division of silicon rectifier cells of all three phases mounted thereon. These cells are connected by flexible connectors to A.C. connectors, each of rectangular frame construction, which is slotted, thus providing parallel circuits and enhancing equal current division among the rows of cells.

Background of the invention

While welding apparatus embodying a power pack has been used for resistance welding and the like, with direct current, such power packs have been cumbersome in construction, and have involved difficulty and expense in assembly or in the replacement of the silicon rectifier cells, and have not provided equal current distribution and uniform loading of the cells, also they have required high manufacturing tolerances and attendant high costs.

Summary of the invention

An object of the present invention is to overcome the above-named disadvantages of conventional D.C. silicon rectifier cell, power packs.

A more specific object of the invention is to provide a novel power pack construction involving, broadly, a neutral conductor sandwiched between and insulated from two D.C. plates, which are in effect water-cooled heat sinks constructed with ears which are electrically bridged to provide equal current distribution, to the silicon rectifier cells of all three phases mounted thereon and connected by flexible connectors to rectangular frame shaped and slotted A.C. connectors electrically connected only at one end to the transformer secondary terminal. The other end is insulatingly secured, for support, to one of the D.C. plates. Uniform cell loading is provided by these and other constructional features.

Brief description of the drawings

Other objects and advantages of the invention will become more apparent from a study of the following description taken with the accompanying drawings wherein:

FIG. 1 is a schematic or wiring diagram of the three phase core type transformer with a three phase half wave rectifier;

FIG. 2 is a perspective view of the D.C. silicon rectifier power pack included in the circuit of FIG. 1 and embodying the present invention;

FIG. 3 is a top view of the power pack shown in FIG. 2;

Description of the preferred embodiment

Figure 4:
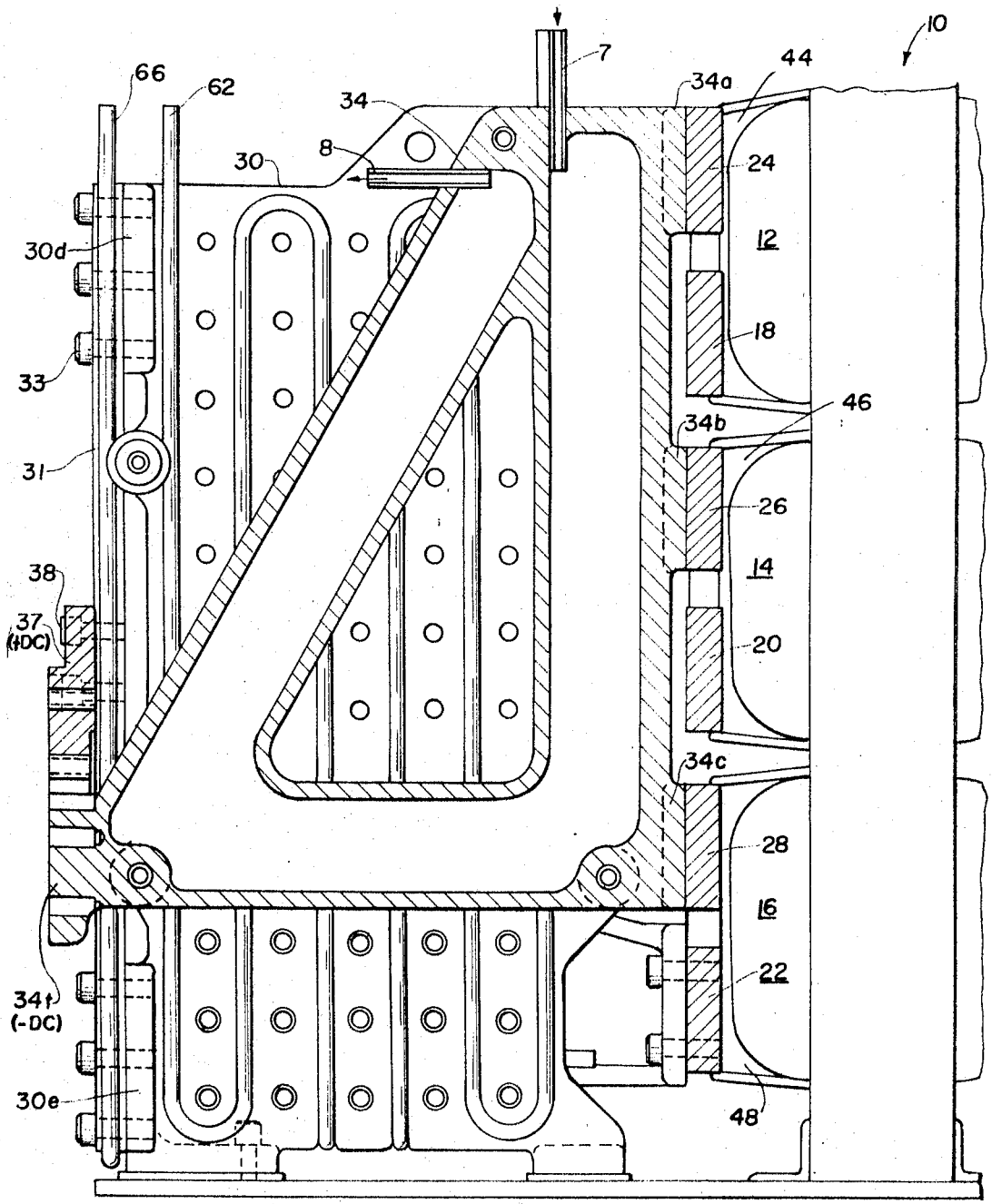
FIG. 4 is a vertical cross-sectional view taken along line IV—IV of FIG. 3.

Referring more particularly to FIG. 1 of the drawings, showing a schematic or wiring diagram of the power pack assembly embodying the present invention, numerals 12, 14 and 16 denote 3 phase transformer primary windings which are delta connected and energized through line conductors $L_1$, $L_2$ and $L_3$ by a suitable source of 3-phase, alternating current. The secondary windings 44, 46 and 48 are Y connected and have one of their ends connected to a common or neutral electrical terminal 34 connected to the —D.C. terminal 34t. The other ends of the secondary windings are connected to rectifiers 4, 5 and 6, such as silicon rectifier cells which, in turn, are connected to a common +D.C. terminal 37 to provide a 3 phase, half wave rectifier, having 6 transformer terminals, two for each phase.

Figures 5, 6:
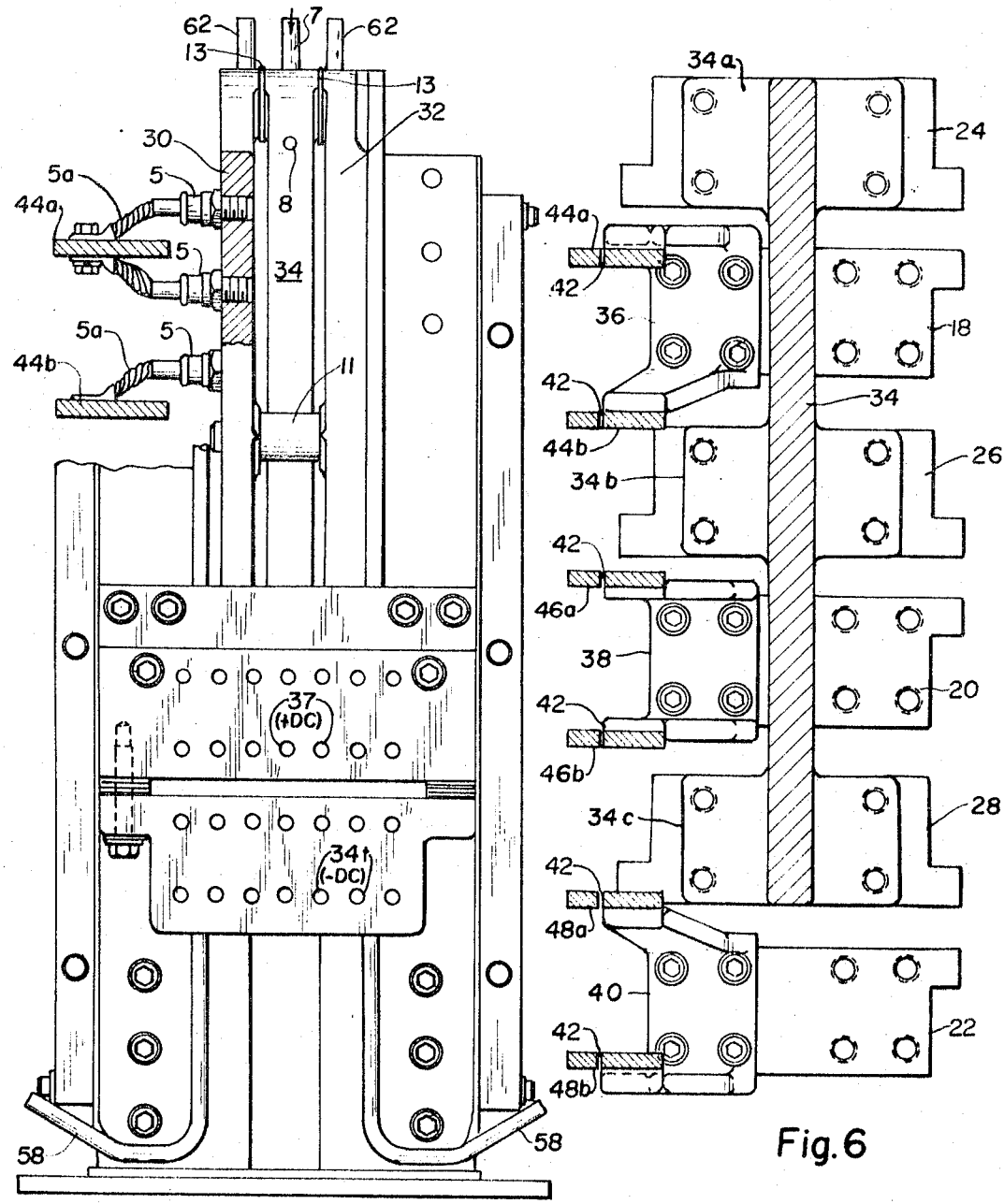
FIG. 5 is a front elevational view of the power pack shown in FIGS. 2 and 3 with a part shown in vertical section.
FIG. 6 is a vertical cross-sectional view taken along line VI—VI of FIG. 3.

FIGS. 2 to 6 inclusive show the novel mechanical details of the 3-phase power pack generally denoted by numeral 10 and illustrated in FIG. 1 which embodies the present invention. A neutral electrical conductor 34 of copper or other suitable electrical conducting material is in the form of a hollow triangle (FIG. 4) having inlet and outlet tubes 7 and 8, respectively, through which cooling fluid or liquid, such as water, may be circulated. Integrally cast at one corner of the triangle is the D.C. terminal 34t of typically minus polarity. Integrally cast on the rear end of neutral conductor 34 are three pads 34a, 34b and 34c which, as best seen in FIG. 6, are connected to secondary winding transformer pads 24, 26 and 28, respectively, secondary windings 44, 46 and 48, respectively, of the transformer assembly including a frame or core for supporting the primary and secondary windings.

The neutral conductor 34 is sandwiched between and insulated, by insulators 11 and 13, from two D.C. conductors or plates 30 and 32 (FIG. 5) of similar but opposite hand construction having identical assemblies mounted thereon. This provides a compact construction and lower reactance between phases. D.C. conductor 30 of cast copper or other suitable electrical conducting material is cored or grooved on its inner surface along a sinuous path (FIGS. 3 and 4) so that cooling coils 62 are practically embedded in the D.C. plates and soldered in place to effectively cool them by passing cooling fluid, such as water, therethrough.

In order to force better current division among the selected rectifier cells (for forward voltage drop) ears 30d and 30e (FIGS. 4 and 2) are integrally cast on the top and bottom of the front end of D.C. conductor 30. These ears are bridged and electrically tied together by a strap 31 of copper or other suitable electrical conducting material secured by bolts 33. A similar construction, as evident from FIG. 2, is provided on the other D.C. conductor 32 including a bridging copper strap 29. The +D.C. terminal 37 of the assembly is connected to and bridged across straps 31 and 29 by bolts 38 or other suitable fastening means. The above described construction of the connecting ears, such as 30d and 30e, of the D.C. conductors or plates enhances equal current division of silicon rectifier cells 4, 5 and 6 mounted thereon. The bridging strap construction equalizes the resistive and reactive paths from any rectifier cell. In a practical sense, current from the upper section feeds through the upper ear 30d, from the lower section, through the lower ear 30e, and from the middle section, through both ears.

Moreover, the provision of a neutral conductor 34 sandwiched between and supporting the D.C. plates 30 and 32 is such that the D.C. plates can be individually adjusted so that the +D.C. terminal 37 indirectly connecting these plates can be aligned with the —D.C. terminal 34t of the neutral conductor, thus eliminating the necessity for close tolerance machine assembly work.

It should be noted that the entire rectifier cell and alternating current conductor assembly mounted on the right side of D.C. conductor 32, as viewed in FIG. 2, is duplicated on the left side of D.C. conductor 30. Therefore, a description of the assembly mounted on D.C. conductor 32 is deemed to suffice. Mounted on the outer side of D.C. conductor 32 is a plurality of silicon rectifier cells (or other suitable rectifiers), such as 5 and 6 (the lowermost cells 4 not being visible in FIG. 2). Each rectifier base or case (cathode) screws into threaded holes in the D.C. plate 32. The rectifier (anode) flexible leads 4a, 5a, 6a are attached to A.C. connectors 48a–48b, 44a–44b, and 46a–46b, respectively (of conductors 48, 44 and 46 shown in FIG. 1). Thus, three A.C. connectors are insulatingly mounted at one end, such as by insulator post 56, on each D.C. plate while the other ends 36, 38 and 40 of the three A.C. connectors are connected to transformer pads 18, 20 and 22 (FIG. 6). Pads 34a, 34b and 34c integrally formed on the neutral conductor 34 are attached to the remaining transformer terminals 24, 26 and 28. Rectifier cells of all three phases are, therefore, mounted on a common plate which also serves as a water-cooled heat sink.

Each A.C. connector is in the form of a rectangular frame, thus providing parallel circuits to enhance equal current division among the rows of rectifier cells by substantially equalizing the voltage drop around the loop. Each A.C. connector is provided with a milled out slot 42 (FIGS. 2, 3 and 6) to force more equal current division among the rectifier cells in a horizontal row. It adds increased reactance to the rectifier cells nearest the transformer pads and assists in balancing the current division within approximately 5 percent. If the slots were not used, the cells nearest the transformer would pass more current than those farthest from the transformer. Cooling coils 50, 54 and 58 are mounted on the sides of the A.C. connectors and are interconnected by flexible tubing 52 through which water or other cooling fluid is conducted.

The use of the above described independently mounted A.C. connectors fastened to one set of transformer terminals with the neutral conductor fastened to the remaining transformer terminals, thus having no other rigid mechanical tie, other than at the transformer terminals, will allow loose assembly tolerances, particularly since the rectifier cell leads 5a, 6a, etc.—that attach to the A.C. connectors are flexible since of multiple or stranded wire construction. Also in such construction, multiple conductors are so spaced and in such relation to the D.C. plates that multiple pairs of diodes can be fastened, one to the top side and one to the underside of the horizontal parallel legs of the rectangular frame connectors (FIG. 5) using a common fastener and in such position that their impedance paths are equal.

Moreover, by mounting rows of rectifier cells on each D.C. plate, each cell can be removed individually, that is, without the necessity of removing adjacent cells, if desired. The cells may be installed similarly.

Thus it will be seen that I have provided a highly efficient, compact and relatively inexpensive three phase silicon rectifier, power pack construction which provides uniform cell loading, low reactance between phases and which will eliminate the necessity for any close tolerance machine and assembly work; wherein the rectifier cells can be removed or replaced individually without the necessity of removing adjacent cells; wherein the rectifier cells of all 3 phases are mounted on a common plate serving as a water-cooled heat sink; wherein equal current division of cells is provided; wherein highly efficient cooling is provided; wherein the A.C. conductors provide parallel circuits to enhance equal current division among rows of rectifier cells by substantially equalizing the voltage drop around the loop; wherein the A.C. conductors are independently mounted and fastened to one set of transformer terminals whereas the neutral conductor is fastened to the remaining transformer terminals, thus having no other rigid mechanical tie and allowing loose assembly tolerances; and wherein the specific construction and mode of assembly enables mass production at low unit cost and a minimum maintenance cost.

I claim:

1. A power pack for an electrical welding machine or the like comprising three-phase transformer primary windings supported on a frame, secondary windings therefor, a neutral electrical conductor connected to said secondary windings and in the form of a plate, a D.C. plate insulatingly mounted on one side of said conductor, a second D.C. plate insulatingly mounted on the other side of said neutral electrical conductor, a plurality of rectifier cells mounted on said D.C. plates and including flexible anode leads connected to all three phases of said secondary windings through the medium of looped connectors.

2. A power pack as recited in claim 1, wherein a plurality of ears are provided on each of said D.C. plates together with connectors electrically bridging said ears for enhancing equal current division of said cells.

3. A power pack as recited in claim 1 wherein said neutral conductor is closely sandwiched between and supports said D.C. plates, together with a first D.C. terminal connected to said neutral conductor, and a second D.C. terminal bridging said D.C. plates and located adjacent said first D.C. terminal.

4. A power pack as recited in claim 1 wherein each of said connectors is in the form of a rectangular frame, and wherein said rectifier cells are of the silicon type and are arranged in parallel rows on said respective D.C. plates with said flexible anode leads attached in parallel rows on parallel legs of each of said respective connectors whereby said cells may be readily removed or replaced without removing adjoining cells.

5. A power pack as recited in claim 4 in which said flexible anode leads are connected to opposite surfaces of each of said opposite major sides of each connector.

6. A power pack as recited in claim 4 wherein each of the two opposite major sides of each connector is slotted substantially centrally for enhancing equal current division of cells.

7. A power pack for an electrical welding machine or other high D.C. current device, comprising multiple phase transformer primary windings supported on a frame together with secondary windings therefor, a water cooled, neutral electrical conductor sandwiched between and insulated from two direct current plates arranged in closely spaced parallel relationship, a plurality of A.C. connectors connected to said secondary windings and insulatingly mounted on the outside of each of said D.C. plates in vertically spaced relationship, and a plurality of rectifier cells having cathodes mounted on and connected to the outside of said D.C. plates and including flexible anode leads connected to said A.C. connectors.

8. A power pack as recited in claim 7 together with a cooling coil mounted on the confronting faces of said direct current plates for conducting cooling fluid to provide a cooled heat sink.

9. A power pack as recited in claim 7 wherein said neutral electrical conductor includes three separate, spaced terminal pads to which one end of each of said secondary windings is independently connected, said A.C. connectors being of substantially rectangular shape for itnerconnecting said anode leads to the other end of said secondary windings.

10. A power pack as recited in claim 7 wherein said A.C. connectors are slotted adjacent the point of connection to said secondary windings to effect more equal current division among the rectifier cells in a horizontal row.

11. A power pack as recited in claim 9 wherein said terminal pads of said neutral electrical conductor are mounted on a common, vertically extending support with the terminal pads of said secondary windings in insulating relationship therewith.

References Cited
UNITED STATES PATENTS

| | | |
|---|---|---|
| 2,917,685 | 12/1959 | Wiegand. |
| 3,223,901 | 12/1965 | Riley. |
| 3,361,951 | 1/1968 | Thorne et al. _____ 321—8 |

JOHN F. COUCH, Primary Examiner

W. H. BEHA, Jr., Assistant Examiner

U.S. Cl. X.R.

219—116; 315—141; 321—27